Sept. 8, 1970  G. D. COOPER  3,527,974
REFLECTOR FOR PRODUCING A COLOR CORRECTED LIGHT COLUMN
Filed Oct. 17, 1966  3 Sheets-Sheet 1
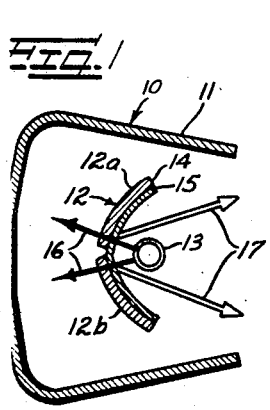
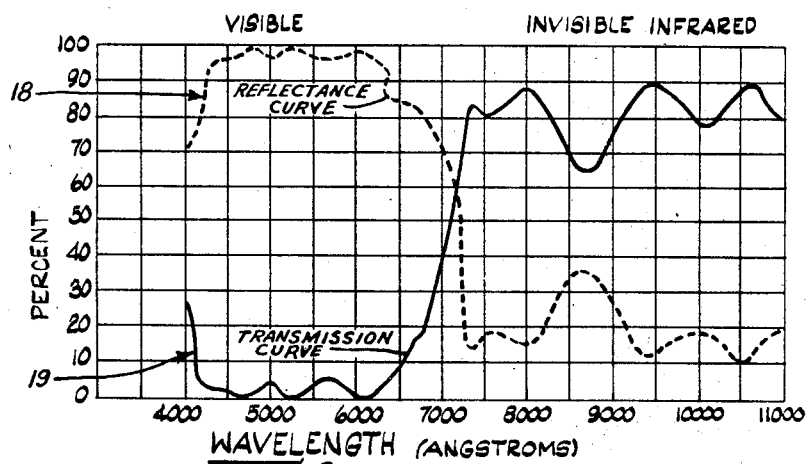
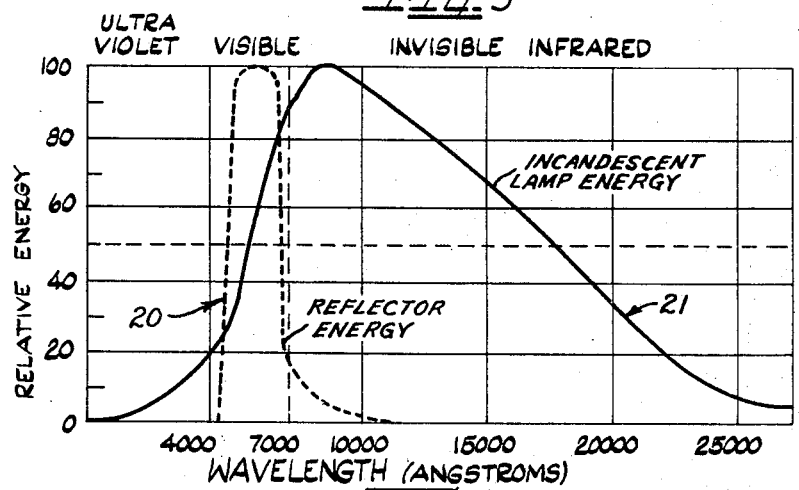
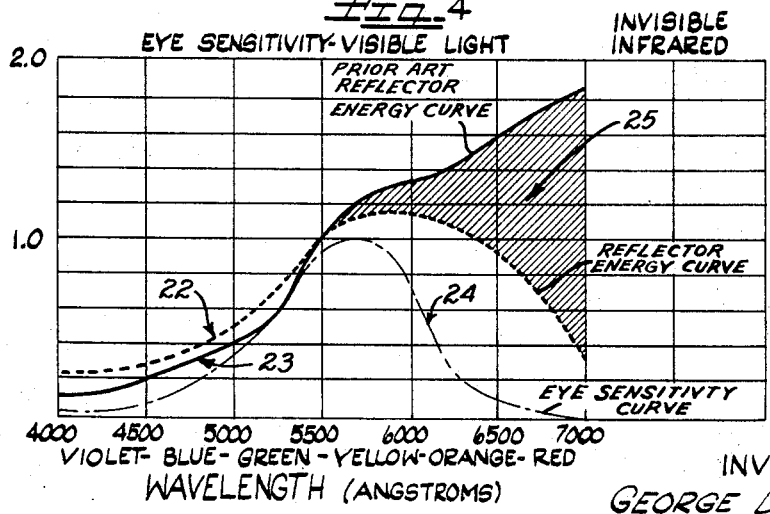
INVENTOR
GEORGE D. COOPER
ATTYS.

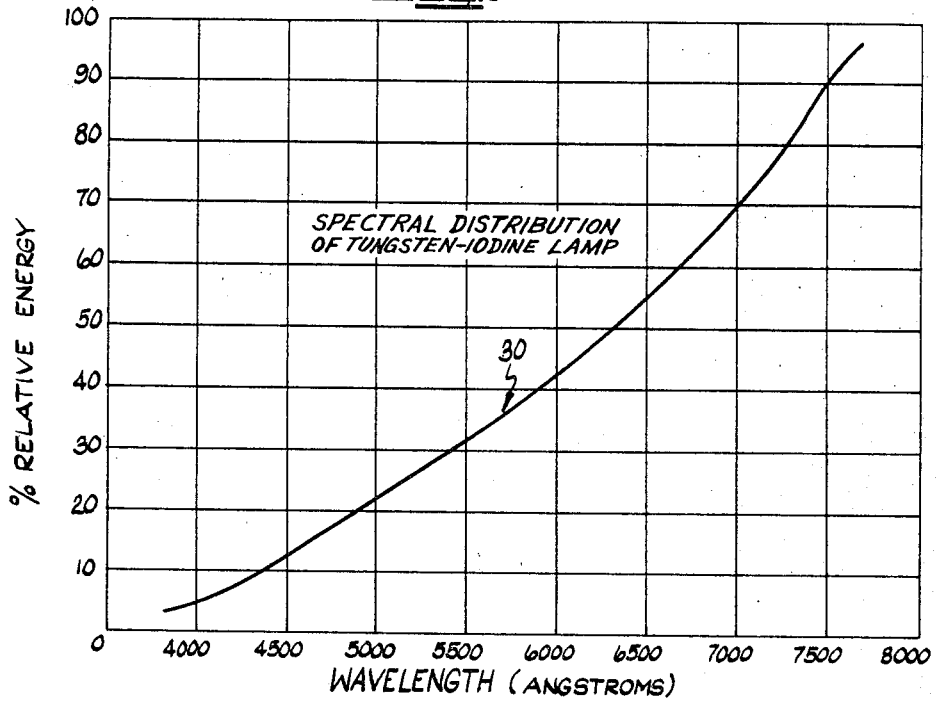
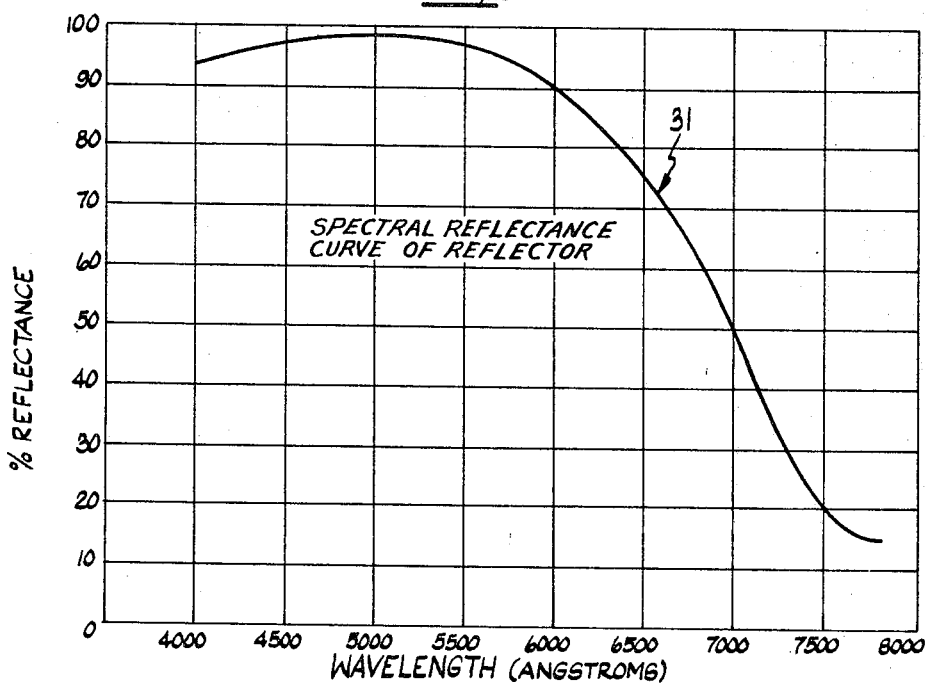

Sept. 8, 1970  G. D. COOPER  3,527,974
REFLECTOR FOR PRODUCING A COLOR CORRECTED LIGHT COLUMN
Filed Oct. 17, 1966  3 Sheets-Sheet 3
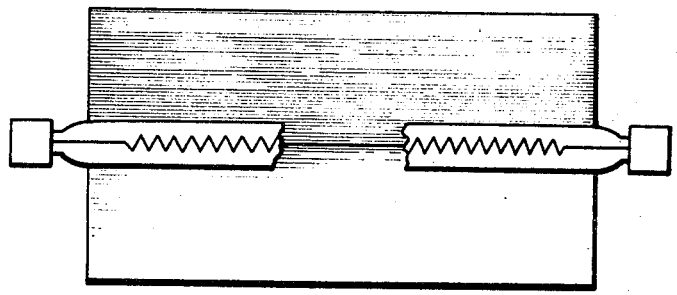
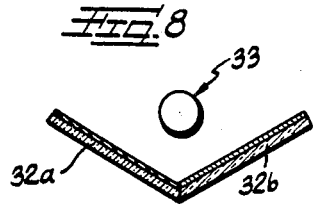
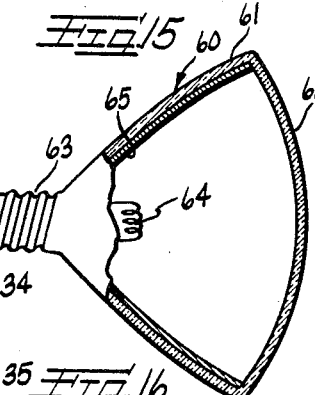
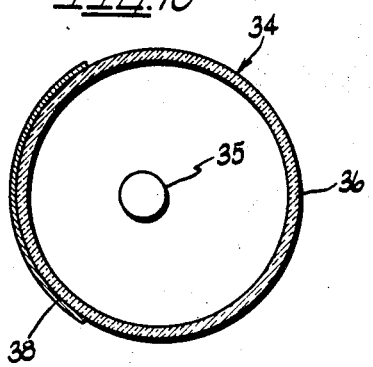
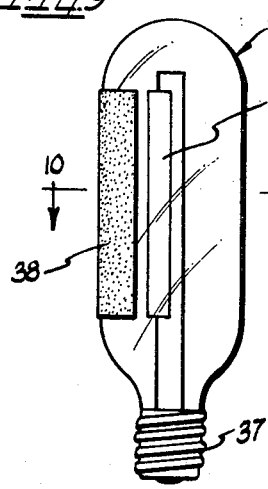
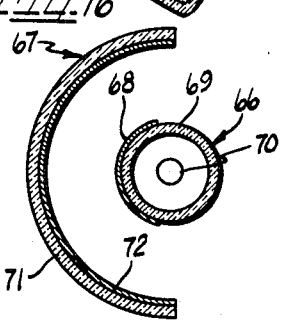
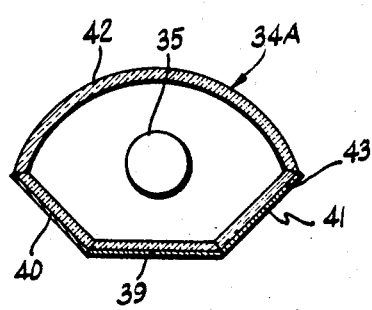
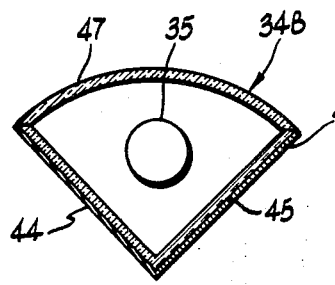
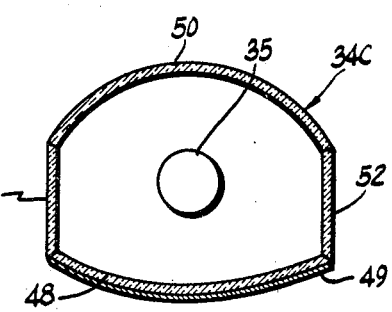
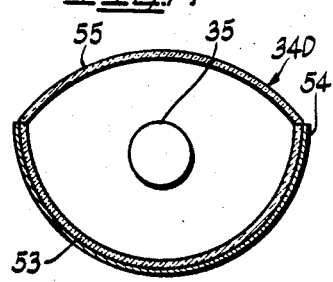
INVENTOR
GEORGE D. COOPER
ATTORNEYS United States Patent Office 3,527,974
Patented Sept. 8, 1970

3,527,974
REFLECTOR FOR PRODUCING A COLOR
CORRECTED LIGHT COLUMN
George D. Cooper, 1136 Vista Place,
Edmonds, Wash. 98020
Continuation-in-part of abandoned application Ser. No.
490,963, Sept. 28, 1965. This application Oct. 17, 1966,
Ser. No. 587,233
Int. Cl. H01j 5/16, 61/40; F21v 7/00; G02b 5/26
U.S. Cl. 313—113                                   17 Claims

ABSTRACT OF THE DISCLOSURE

Reflector to be used with a source of radiant energy for coaction therewith to be placed adjacent to the source and define a light column which will reflect certain visible radiant energy that will mix with visible and invisible radiant energy emitted directly from the source to produce a light column having a color temperature quality different from that of the source.

---

This application is a continuation-in-part of my application Ser. No. 490,963, filed Sept. 28, 1965, now abandoned.

This invention relates in general to a reflector, and more particularly to a reflector to be used with a source of radiant energy to reflect certain of the radiant energy to coact with the source and define a color corrected light column having a predetermined color temperature. The reflector of the invention may be employed independent of a source of radiant energy or it may be applied directly to a lamp constituting a source of radiant energy.

The reflector of the present invention includes a transparent substrate having a plurality of layers of selective reflecting material on one or both sides thereof capable of reflecting predetermined wavelengths or percentages of certain wavelengths of radiant energy and of transmitting substantially all other wavelengths or percentages of other wavelengths of radiant energy so that the light column produced by the source of radiant energy and the reflector is different from that produced only by the source of radiant energy and is color corrected to have a desirable color temperature. The coatings or layers of selective reflecting material are preferably hard and chemically stable, and of dielectric metals or other suitable conventionally available materials, and which are applied to a transparent substrate by means of thermal evaporation of metallic elements within a vacuum chamber. Such coatings or layers have been commonly known as dichroics in that they reflect certain wavelengths of radiant energy and transmit other wavelengths of radiant energy. Preferably, the substrate is of a heat resistant material such as glass since it is normally subjected to high heat energy from the source of radiant energy. For example, the present invention as applied to a unit including an incandescent source of radiant energy having a color temperature of 2950° K. would coact with that source and produce a color corrected light column having a temperature of between 3200 and 3800° K., this being a most suitable range for visible energy usable by the eye. Likewise, the color temperature of any source could be raised or lowered a like proportional amount in accordance with the present invention.

The present invention may be employed on a substrate arranged to be optically spaced from a source of radiant energy, or the reflector of the invention may be directly applied to the exterior surface of an envelope of a presently available lamp, or in some lamps on the interior surface of the envelope such as a tungsten-iodine or Lucalox lamp or any other type. In either case, the reflector would be sided to handle the filament and reflect a desired amount of the energy emitted by the filament so that a particular color temperature is obtained. The reflective characteristics of the coating comprised in the reflector and the size of the reflector determining the amount of emitted energy to be reflected would have to be coordinated in order to define a predetermined color temperature in the light column. It is also contemplated according to the invention that the envelope of a lamp may be shaped to provide the desired optics of the light column where the reflector is applied directly to the envelope. While it is recognized that lamp envelopes have heretofore been formed and coated to define a reflector having an optical design, such a reflector has not been of the color correcting type as contemplated by the present invention.

The art of dichroic coatings is well known, but heretofore dichroic mirrors or reflectors have only reflected substantially all of the wavelengths of radiant energy in the visible range, while transmitting substantially all of the wavelengths of radiant energy in the invisible ranges, such as shown in the Strawick Pat. No. 3,099,403.

It is therefore an object of the present invention to provide an improved reflector that is capable of coacting with a source of radiant energy to produce a light column with a color corrected product.

Another object of this invention resides in the provision of a reflector including a transparent substrate having a plurality of layers of selective reflecting material thereon that is capable of reflecting certain wavelengths of energy and of transmitting other wavelengths of energy so that a color corrected light column may be produced.

A still further object of this invention is in the provision of a reflector capable of coacting with a source of radiant energy to define a color corrected light column with a great portion of the heat energy removed therefrom.

Another object of this invention is to provide a reflector having color corrected cold mirror coatings.

Still another object of this invention is in the provision of a reflector having a transparent substrate of heat resistant material with a plurality of layers of selective reflecting material thereon capable of reflecting with a high degree of efficiency full visible spectrum balanced energy and of transmitting the invisible energies.

A further object of this invention resides in the provision of a reflector capable of coacting with a source of radiant energy to define a column of light having a color temperature higher or lower than that of the source of radiant energy.

A still further object of this invention is to provide a reflector that may be applied directly to the envelope of a lamp defining a source of radiant energy so that the light column generated by the lamp may have a predetermined color temperature differing from the color temperature of the lamp.

Another object of this invention is in the provision of a lamp for emitting a source of radiant energy, wherein the lamp includes an envelope that is specially formed to define in combination with a color correcting reflective coating thereon a reflective optic system for the lamp that does not depend upon any other reflector.

A still further object of the invention is to provide a reflector adapted to be used with a tungsten-iodine lamp having a color temperature of about 2950° K. to define a color corected light column having a color temperature of about 3300° K., wherein the reflector has impinging thereon about fifty percent of the radiant energies emitted from the lamp and provides a spectral reflectance curve wherein the reflectance in terms of selected wavelengths is 95% or more between 4200 and 5700 A., 95 down to 90% between 5700 and 6000 A., 90 down to 75% between 6000 and 6500 A., 75 down to 50% between 6500 and 7000 A., and 50 down to 20% between 7000 and 7500 A., when the tolerance for the selected wavelengths is plus or minus 100 A.

Other objects, features and advantages of the invention will be apparent from the following detailed disclosure, taken in conjunction with the accompanying sheets of drawings, wherein like reference numerals refer to like parts, in which:

FIG. 1 is a diagrammatic view of a light fixture having a reflector in accordance with the present invention;

FIG. 2 is a graphical illustration of the reflectivity and transmissivity of one form of reflector in accordance with the present invention;;

FIG. 3 is a graphical illustration of the spectral energy distribution curve produced by one source of radiant energy and a reflector in accordance with the invention, and the spectral energy distribution curve produced by the source of energy without a reflector or with a standard type reflector that reflects all of the radiant energy;

FIG. 4 is a graphical illustration showing the color content of a light column produced by a source of radiant energy and a reflector of the present invention, and the source of radiant energy by itself or with a reflector that reflects all of the radiant energies;

FIG. 5 is a graphic representation showing the spectral distribution of energy for a tungsten-iodine lamp having a color temperature of about 2950° K.;

FIG. 6 is a graphical illustration showing the spectral reflectance curve for a reflector according to the invention adapted to be used with a tungsten-iodine lamp having the energy distribution as shown in FIG. 5 and wherein approximately 50% of the emitted energy impinges on the reflector so that the light column has a color temperature of about 3300° K.;

FIG. 7 is a somewhat diagrammatic top plan view of a light fixture according to the invention including a reflector and source of radiant energy where about 50% of the emitted energy is impinging on the reflector;

FIG. 8 is a transverse sectional view taken substantially along line 8—8 of FIG. 7;

FIG. 9 is an elevational view of a lamp having the reflective coating on the envelope thereof in accordance with the present invention;

FIG. 10 is an enlarged transverse sectional view taken substantially along line 10—10 of FIG. 9;

FIG. 11 is a somewhat diagrammatic transverse sectional view taken through a lamp having an envelope formed to be at least partially coated with reflective material to define an optic system for producing a particular light column having a particular color temperature;

FIG. 12 is a view similar to FIG. 11 showing a modified lamp envelope and reflector arrangement;

FIG. 13 is a view similar to FIG. 11 showing a still further modified envelope and reflector arrangement;

FIG. 14 is a view similar to FIG. 11 showing a still further modified lamp envelope and reflector arrangement;

FIG. 15 is a side elevational view of a conventional spotlight lamp having a reflector according to the present invention; and FIG. 16 is a view similar to FIG. 11 showing a still further modification of the invention where a lamp having a reflectorized envelope is arranged with another reflector in a light fixture.

Referring now to the drawings, and particularly to FIG. 1, a light fixture 10 embodying the present invention is shown having a housing 11 for mounting therein a reflector 12 and a source of radiant energy 13. While the reflector 12, as illustrated, includes reflector segments 12a and 12b, that are essentially parabolic, elongated segments, it should be appreciated that they may be of any other geometric shape, or that the reflector may be of one piece construction. The reflector includes a transparent substrate 14 having a plurality of layers of selective reflecting material 15 thereon. While the substrate may be of any suitable material, it is desirable that it be of a heat resistant material such as a heat resisting glass, especially where the source of radiant energy has a high heat output. The coatings or layers 15 may be on the front or back face of the substrate or on both faces, but preferably on the front face as illustrated to avoid any loss of those wavelengths of radiant energy desired to be reflected which might otherwise be absorbed by the substrate.

The layers of selective reflective material are preferably applied to the substrate by the well known method of thermal evaporation of metallic elements within a vacuum so that a reflective coating, which is highly efficient for reflecting certain wavelengths or a percentage of certain wavelengths of radiant energy, is produced.

The reflector of the present invention produces a light column of color corrected light less the invisible energies that impinge thereon, and which is quite close to the response of the human eye relative to color so that colored objects observed by the human eye can be readily distinguished, and especially so that shades of any one color can be easily distinguished. Moreover, the invisible radiant energies, not useful for detecting colors are not reflected by the reflector of the present invention, thereby eliminating a portion of the heat energy contained in the infrared portion of the spectrum. As seen in FIG. 1, the unwanted wavelengths of radiant energy emanating from the source 13 and impinging against the reflector 12 are transmitted through the reflector as indicated generally by the solid arrows 16, while the wanted wavelengths of radiant energy emanating from the source 13 and impinging upon the reflector 12 are reflected into the light column as illustrated by the hollow arows 17.

Referring now to FIG. 2, the reflectivity and transmissivity of a reflector according to the invention to coact with a source of radiant energy having a color temperature of about 2950° K., such as a standard incandescent, quartz-iodine lamp operating at rated voltage and with such a color temperature rating, is shown respectively by the dash line 18 and the solid line 19. More particularly, the characteristics of the reflector plotted in FIG. 2 are such that substantially all of the visible radiant energy between 4000 and 6000 angstrom units is reflected while substantially none is transmitted, while about half of the visible radiant energy between 6000 and 7500 angstrom units is reflected, while about half is transmitted. A reflector having these characteristics, and coacting with a source of radiant energy having a color temperature of 2950° K. will produce a light column having a color temperature of between 3200 and 3800° K., and specifically about 3400° K. In an embodiment similar to that shown in FIG. 1, it can be readily seen that a portion of the radiant energy emanating from the source 13 will impinge on the reflector 12 and thereafter have a portion thereof reflected into the light column, while a portion of the radiant energy emanating from the light source 13 will go directly into the light column. Where the color temperature of the radiant energy emanating directly from the source 12 is about 2950° K., that radiant eneregy going directly into the light column will be mixed with radiant energy reflected by the reflector 12 having a much greater color temperature so that the light column mixture will have a resulting color temperature of between 3200 and 3800° K.

A graphical illustration of the wavelengths of radiant energy reflected by a reflector according to the invention and according to the reflectivity curve 18 and transmissivity curve 19 relative to the radiant energies of an incandescent lamp having a color temperature of 2950° K. is shown in FIG. 3, wherein the plotted curve 20 represents the energy reflected by the reflector of FIG. 2, and the plotted curve 21 represents the energy in the incandescent lamp as directly emanating therefrom or as being reflected by a reflector, such as one made of Alzak aluminum, which is intended to reflect all of the wavelengths of radiant energy, but in reality reflects 70 to 85% of the energies and absorbs the remaining. It is readily seen that the plotted curve 20 represents a more balanced color energy than the curve 21 which extends deeply into the invisible infrared.

The graphical illustration in FIG. 4 shows a plotted curve 22 for a light column produced by a source of radiant energy and a reflector of the present invention of the type having reflectivity and transmissivity in accordance with FIG. 2, and a plotted curve 23 for the same source of radiant energy in combination with a standard reflector, such as one made of Alzak aluminum, that reflects all of the radiant energies. This graphical illustration also includes a plotted line 24 that represents the human eye sensitivity curve. The readings plotted on curves 22 and 23 represent relative amounts of energy at each color range, and it is seen that the curve 22 representing the energy produced by the present invention constitutes a balanced energy curve. It can be seen that the plotted curve 22 is much closer to the eye sensitivity curve 24 than the plotted curve 23, and that the reflector of the present invention reflects higher in the blues (4000 to 5500 angstroms) and lower in the reds (5500 to 7000 angstroms). Most significant is the removal of the energy 25 shown in the reds.

While reference heretofore has been made to the use of a reflector according to the present invention in connection with an incandescent source of radiant energy or a source of radiant energy having a temperature of about 2950° K., it should be appreciated that the invention could be equally applied in connection with other sources of radiant energy such as mercury vapor or fluorescent lamps or the like that emit radiant energy high in the visible blues. Moreover, the invention could be applied to a source emitting high in the yellow-orange region like the Lucalox. It is well known that an incandescent source of radiant energy is high in the reds. Where the source of radiant energy would be one that is high in the visible blues, the reflector would selectively reflect only a portion of the blues and all of the reds, while transmitting a portion of the blues to effectively produce a color corrected light column. Thus, a reflector of the present invention would have layers of selective reflecting material for reflecting such visible radiant energy as to produce a desire color temperature, while transmitting substantially all of the other radiant energies.

A more specific example of the present invention is illustrated in FIGS. 5–8, wherein the tungsten-iodine lamp or source of radiant energy having a color temperature of about 2950° K. is employed with a reflector according to the invention having well defined spectral reflectivity characteristics and where about 50% of the energy emitted from the lamp impinges on the reflector thereby defining a light column having a color temperature of about 3300° K.

A spectral energy distribution curve is shown in FIG. 5 for a tungsten-iodine lamp having a color temperature of about 2950° K., wherein the energy curve is identified by the numeral 30. In this chart, the wavelength in angstroms (A) is plotted along the horizontal axis while the percent relative energy is plotted along the vertical axis, and it can be readily seen that a larger portion of the energy is in the reds between 6300 and 7600 A.

The spectral reflectivity distribution of the reflector to coact with the tugsten-iodine source of 2950° K. is illustrated in FIG. 6, wherein wavelength in angstroms is plotted along the horizontal axis, while reflectance is plotted in percent along the vertical axis. The curve is generally designated by the numeral 31 and is shown to represent 95% or more reflectivity between 4200 and 5700 A., 95 down to 90% reflectivity between 5700 and 6000 A., 90% down to 75% reflectivity between 6000 and 6500 A., 75% down to 50% between 6500 and 7000 A., and 50% down to 20% between 7000 and 7500 A. This curve, where the selective wavelengths have a tolerance of plus or minus 100 A., will coact with the tugsten-iodine lamp to produce a color temperature of about 3300° K. where 50% of the energy from the lamp is treated by the reflector.

FIGS. 7 and 8 merely show a representative light fixture according to the invention wherein reflector segments 32a and 32b coact to define a reflector to be used in combination with the tugsten-iodine source 33 that is optically arranged with respect to the reflector so that about 50% of the energy emitted from the lamp impinges upon the reflector. The other 50% of the emitted energy goes directly into the light column produced by the fixture, and therefore it may be said that about 50% of the energy is direct and about 50% of the energy is reflected for the light column.

It should be appreciated that the characteristics of the reflectivity curve 31 in FIG. 6 define the amount of yellow-orange-red energy removed from the light column relative to that energy which impinges upon the reflector, and that where a larger percent of energy is reflected the energy removed by the reflector would be less in order to maintain a color temperature of 3300° K. in the light column. For example, if a light fixture were to employ the tungsten-iodine source having a spectral distribution curve like that shown in FIG. 5 which produces a color temperature of about 2950° K., and a reflector according to the invention which would be associated with the lamp to reflect about 75% of the energy emitted therefrom, the spectral reflectance curve of the reflector would have to be modified over that shown in FIG. 6 so that a less amount of energy in the yellow-orange-red wavelengths is removed from the light column by the reflector or transmitted through the reflective coating than that indicated in FIG. 6. Conversely, if only 25% of the emitted energy was to be reflected and 75% was to be direct, a greater amount, percentagewise, of the yellow-orange-red wavelengths would have to be removed by the reflector in order to maintain a 3300° K. color temperature in the light column.

Referring now to FIGS. 9 and 10, a lamp 34 includes a filament or light generating portion 35 supported within a transparent glass envelope 36 and electrically connected to a screw base or socket 37. This lamp generally approximates the Lucalox lamp which has a color temperature of about 2400° K. with an extremely high lumen per watt output. The envelope 36 is cylindrical in shape, but could take any other cross sectional shape as will be more clearly hereinafter evident. A color correcting reflector 38 according to the present invention is illustrated along one side of the filament 35 as applied to the external surface of the lamp envelope 36. Thus, the reflector 38 would comprise a plurality of layers of selectively reflective material applied in a manner heretofore described, as shown at 15 in FIG. 1, directly to the exterior surface of the envelope. As seen most clearly in FIG. 10, the reflector 38 extends about 120° around the envelope 36, although it could extend any desired arcuate distance around the envelope. The 120° arcuate width would cause treatment of about one-third of the radiant energy emitted from the filament 35 while about two-thirds of the energy would be emitted directly. It is only necessary that the longitudinal length of the reflector 38 approximate the longitudinal length of the filament 35 and be substantially aligned therewith in order to be effective.

The reflectivity characteristics of the reflector 38 would be made compatible with the amount of energy treated thereby and the desired color temperature of the light column defined by the lamp. For example, where the lamp is a General Electric Lucalox, a large percentage of the yellow-orange-red energy would be removed in order to raise the color temperature above that of the lamp. The optics for the lamp and reflector combination are determined by the shape of the reflector and the positioning of the filament thereto. The example of FIGS. 9 and 10 would provide a flood-type light column.

It should be further understood that the optics for a lamp having a reflector on its envelope can be varied by varying the cross sectional configuration of the envelope. For example, FIG. 11 shows a modified envelope 34A having a reflector portion defined by a flat portion 39 arranged directly behind the filament 35, together with diverging flat portions 40 and 41. An arcuate section 42 connects the outer free ends of the diverging flat portions 40 and 41 which remains clear and effectively operates as a front lens, while the portions 39, 40 and 41 are coated with layers of selective reflecting material to define a reflector 43. Preferably, the reflector 43 would operate to color correct the color temperature of the filament 35. The shape of the reflector and association with the filament 35 would operate to treat about one-half of the radiant energy emitted from the filament and define a modified flood-type beam.

It should be further appreciated that the outer surface of the arcuate portion 34 may be coated with a compatible "hot" mirror for reducing the heat in the light column and in particular preventing the transmission of infrared contained in the radiant energy emitted directly from the filament 35. Other types of reflectors may be applied to the arcuate portion 42 to allow one or a combination of colors to pass therethrough.

FIGS. 12, 13 and 14 show other possible cross sectional forms that the envelope for a lamp may take to provide the desired optics for a reflector lamp arrangement. The envelope 34B of FIG. 12 is formed to provide a V-shaped reflector portion including flat sections 44 and 45 having thereon a reflector 46 in accordance with the invention, and a front arcuate-shaped lens 47. The envelope 34C in FIG. 13 includes a reflector portion defined by an arcuate section 48 having a reflector 49 thereon, and a front lens portion defined by an arcuate section 50 in opposed relationship to the reflector portion, and opposed flat side portions 51 and 52. The embodiment of FIG. 13 would give a wide column of light. And the envelope 34D shown in FIG. 14 includes a parabolic reflector portion 53 having a reflector 54 thereon, and an arcuate front lens 55. It should be further appreciated that any other number of cross sectional shapes for the lamp envelope may be employed to give the desired optics system.

FIG. 15 shows a standard spotlight lamp 60 including a dish-shaped, small parabolic envelope 61 closed at the outer open end by a front lens 62 and necked down at the inner end for mounting of a screw-type base 63 thereon. This lamp is of the incandescent type and includes a tungsten filament 64 that defines the source of radiant energy. A reflector 65 according to the invention is applied to the interior surface of the envelope 61 for generally reflecting the visible radiant energies and transmitting the invisible radiant energies plus a portion of the visible radiant energies in order to produce a light column having a predetermined color temperature. This embodiment merely illustrates the possible application of a reflector according to the present invention to this type of a lamp.

The embodiment of FIG. 16 illustrates a lamp 66 of the type shown in FIGS. 9 and 10 employed in combination with a reflector 67 of the type similar to that shown in FIGS. 7 and 8. This embodiment is useful where a lamp is employed that emits a great amount of its total energy in a rather narrow wavelength band. For example, the major portion of the total energy emitted from a Lucalox lamp is in the yellow-orange region between approximately 5500 to 6000 A. A reflector 68 is applied to the exterior surface of the lamp enevelope 69 so that about 33% of the energy emitted from the filament 70 impinges on the reflector 68. For this application, the reflector 68 would be designed to transmit substantially all of the narrow band of energy between approximately 5500 and 6000 A., while at the same time reflecting all other visible energy. Thus, the visible energy from about 4000 A. to 5500 A., and 6000 A. to about 7200 A. would be reflected by the reflector 68.

The separate reflector 67 would include the usual glass substrate 71 with the reflective material on the front face and identified by the numeral 72, whereby the reflective coating 72 would reflect substantially all visible energy between 4000 and 5500 A., substantially all of the visible energy in the approximate range of 6000 A. to 7400 A., and a selected percentage of the visible energy between 5500 and 6000 A. in order to produce a predetermined and/or desirable color temperature in the light column. Further, the reflector 67 would be sized to treat any desired percentage of the energy emitted from the lamp and through the reflector 68. The coating 72 would be much more sophisticated than the reflective coating 68 and would be designed to coact with the lamp 66 in a fixture to produce any desired color temperature such as 2900° K., 3000° K., 3200° K., or 3300° K., or any other desired temperature. Further, the coating 72 could operate to strip out any of the invisible radiant energy that impinges thereon.

Thus, a relatively inexpensive coating could be applied directly to the lamp thereby making replacements as inexpensive as possible, while the color correcting reflector 67 would function as a permanent part of the light fixture. With this arrangement, the reflector 67 serves to reflect the various percentages of certain wavelengths in order to provide the mixing in the light column of that radiant energy to produce a predetermined color temperature.

Where the lamp employed would be of the mercury-vapor type, the narrow band pass coating on the lamp envelope would be arranged to correspond to the peaks of energy available from such a lamp. Again, the individual reflection 67 would have a coating thereon in order to coact with the reflectorized mercury-vapor lamp and produce the desired color temperature. More particularly, the peak energy of about 4500 to 5500 A. would be permitted to pass through the reflector on the lamp envelope. It should further be appreciated that any other type of reflectorized lamp may be employed in an arrangement like that shown in FIG. 16.

It will be understood that modifications and variations may be effected without departing from the scope of the novel concepts of the present invention.

The invention is hereby claimed as follows:

1. A reflector for use with a source of radiant energy to reflect therefrom certain of the radiant energy to coact with said source and define a color corrected light column having a color temperature of between 3200 and 3800° K., said reflector comprising a transparent substrate, and a plurality of layers of selective reflecting material reflecting substantially all but that part of the visible radiant energy necessary to produce said color temperature and transmitting substantially all of the invisible radiant energy and that said part of the visible radiant energy.

2. A reflector as defined in claim 1, wherein said substrate is of heat resisting glass.

3. A reflector for use with a source of incandescent radiant energy to reflect therefrom certain of the radiant energy to coact with said source and define a color corrected light column having a color temperature of between 3200 and 3800° K. and to transmit substantially all of the radiant energy above and below the visible, said reflector comprising a transparent substrate, and means including a plurality of layers of selective reflecting material reflecting substantially all but that part of the visible radiant energy necessary to produce said color temperature and transmitting substantially all of the invisible radiant energy and that said part of the visible radiant energy.

4. A reflector as defined in claim 3, wherein said substrate is curvate and of heat resisting glass.

5. A reflector as defined in claim 3, wherein said source of incandescent radiant energy has a color temperature of about 2950° K.

6. The combination as defined in claim 3, wherein the source of radiant energy is high in the reds.

7. The combination as defined in claim 1, wherein the source of radiant energy is high in the blues.

8. A reflector for use with a source of radiant energy, said reflector comprising a transparent substrate, and means including selective reflecting material on said substrate reflecting substantially all but a part of the visible radiant energy of said source and transmitting substantially all of the invisible radiant energy and said part of the visible radiant energy to produce a light column having a predetermined color temperature different from said source.

9. A reflector for use with a source of radiant energy to reflect therefrom a portion of the radiant energy of the source and define a light column having a color temperature substantially higher than the color temperature of said source, said reflector comprising, a transparent substrate, and means including a plurality of layers of selective reflecting material on said substrate reflecting substantially all but that part of the visible radiant energy necessary to produce a color temperature substantially higher than that of the source and transmitting substantially all of the invisible radiant energy and that said part of the visible radiant energy.

10. A reflector for use with a source of radiant energy to reflect therefrom a portion of the radiant energy of the source and define a light column having a color temperature substantially lower than the color temperature of said source, said reflector comprising, a transparent substrate, and a plurality of layers of selective reflecting material on said substrate for reflecting substantially all but that part of the visible radiant energy necessary to produce a color temperature substantially lower than that of the source and transmitting substantially all of the invisible radiant energy and that said part of the visible radiant energy.

11. A reflector for use with a tungsten-iodine source of radiant energy having a color temperature of about 2950° K. to reflect certain of the radiant energy emitted from the source to coact with other radiant energy emitted directly from said source and define a color corrected light column having a color temperature of about 3300° K. wherein the reflector has impinging thereon about 50% of the radiant energy emitted from said source, said reflector comprising a transparent substrate, a plurality of layers of selective reflecting material reflecting substantially all but a part of the visible radiant energy and transmitting substantially all of the invisible radiant energy and that said part of the visible radiant energy so that said color temperature is produced, and said reflector providing a spectral reflectance curve wherein the reflectance in terms of selected wavelengths between 4200 and 7500 A. is 95% or more between 4200 and 5700 A., 95 down to 90% between 5700 and 6000 A., 90 down to 75% between 6000 and 6500 A., 75 down to 50% between 6500 and 7000 A., and 50 down to 20% between 7000 and 7500 A., wherein the tolerance for the selected wavelengths is plus or minus 100 A.

12. A reflector for use with a tungsten-iodine source of radiant energy having a color temperature of about 2950° K. to reflect certain of the radiant energy emitted from the source to coact with other radiant energy emitted directly from said source and define a color corrected light column having a color temperature of about 3300° K. wherein the reflector has impinging thereon about 50% of the radiant energy emitted from said source, said reflector comprising a transparent substrate, a plurality of layers of selective reflecting material reflecting substantially all but a part of the visible radiant energy and transmitting substantially all of the invisible radiant energy and that said part of the visible radiant energy so that said color temperature is produced, and said reflector providing a spectral reflectance curve wherein the reflectance in terms of selected wavelengths between 4200 and 7500 A. is at least 95% between 4200 and 5700 A., 90% at 6000 A., 75% at 6500 A., 50% at 7000 A., and 20% at 7500 A.

13. A method of altering the apparent color temperature of an iodine-tungsten source of radiant energy from about 2950° K. to about 3300° K. which comprises reflecting about 50% of the radiant energy emitted from the source and mixing same with the remaining energy emitted directly therefrom with a reflector formed from a transparent substrate and a plurality of layers of selective reflecting material for reflecting substantially all but a part of the visible radiant energy and transmitting substantially all of the invisible radiant energy and that part of the visible radiant energy so that said color temperature is produced wherein the reflectance in terms of selected wavelengths between 4200 and 7500 A. is 95% or more between 4200 and 5700 A., 95 down to 90% between 5700 and 6000 A., 90 down to 75% between 6000 and 6500 A., 75 down to 50% between 6500 and 7000 A., and 50 down to 20% between 7000 and 7500 A., wherein the tolerance for the selected wavelengths is plus or minus 100 A.

14. An electric lamp having a filament generating a source of radiant energy, a glass envelope about the filament, and a base secured to the envelope and electrically connected to said filament, a reflector directly on the exterior of said envelope including a plurality of layers of selective reflecting material for reflecting substantially all but a part of the visible radiant energy and transmitting substantially all of the invisible radiant energy and that part of the visible radiant energy, said reflector sized to reflect a predetermined amount of the radiant energy emitted from the filament to coact with the other radiant energy emitted directly from the filament, and said envelope being formed to coact with the filament and the reflector to define a predetermined column of visible radiant energy, said layers of selective reflecting material coacting with the size of the reflector and the color temperature of the filament to produce in the column a color temperature different than that of the filament.

15. The combination as defined in claim 14, wherein said reflector provides a spectral reflectance curve where the reflectance in terms of selected wavelengths between 4200 and 7500 A. is 95% or more between 4200 and 5700 A., 95 down to 90% between 5700 and 6000 A., 90 down to 75% between 6000 and 6500 A., 75 down to 50% between 6500 and 7000 A., and 50 down to 20% between 7000 and 7500 A., wherein the tolerance for the selected wavelengths is plus or minus 100 A., said filament has a color temperature of about 2950° K., said reflector is sized so that about 50% of the radiant energy emitted from the filament impinges thereon, and said column will have a color temperature of about 3300° K.

16. The combination as defined in claim 1, wherein the source of radiant energy is high in the yellow-orange.

17. A light fixture including an electric lamp and a reflector, said lamp having a filament generating a source of radiant energy wherein a major portion of the visible energy is concentrated in a narrow part of the visible spectrum, a glass envelope about the filament, a base secured to the envelope and electrically connected to said filament, a reflector coating directly on the exterior of said envelope including a plurality of layers of selective reflecting materials for reflecting all but a part of the visible radiant energy and transmitting substantially all of the visible energy concentrated in the narrow part of the visible spectrum, said reflector being arranged adjacent the lamp and coacting with the reflector coating on the lamp to define a predetermined light column, and said reflector including a transparent substrate having a plurality of layers of selective reflecting material thereon reflecting substantially all of the visible radiant energy outside of the narrow part being transmitted by said lamp reflector coating and reflecting a predetermined percentage of said narrow part to produce a predetermined color temperature in the light column.

References Cited

UNITED STATES PATENTS

| | | | | |
|---|---|---|---|---|
| 2,552,184 | 5/1951 | Koch | | 88—24 |
| 2,852,980 | 9/1958 | Schroder | | 88—105 |
| 3,099,403 | 7/1963 | Strawick | | 240—47 |
| 3,174,067 | 3/1965 | Bahrs | | 313—110 |
| 2,660,925 | 12/1953 | Turner | | 350—1 |
| 2,798,943 | 7/1957 | Prideaux | | 240—47 |

ROBERT SEGAL, Primary Examiner

V. LAFRANCHI, Assistant Examiner

U.S. Cl. X.R.

240—41.35; 350—290